United States Patent
Liao et al.

(10) Patent No.: US 11,128,846 B2
(45) Date of Patent: Sep. 21, 2021

(54) PROJECTION DISPLAY SYSTEM AND PROJECTOR ADJUSTMENT METHOD

(71) Applicant: Delta Electronics, Inc., Taoyuan (TW)

(72) Inventors: Tien-Chih Liao, Taoyuan (TW); Chia-Jui Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/875,637

(22) Filed: May 15, 2020

(65) Prior Publication Data

US 2020/0396428 A1 Dec. 17, 2020

(30) Foreign Application Priority Data

Jun. 17, 2019 (CN) .......................... 201910521835.4

(51) Int. Cl.
*H04N 9/31* (2006.01)
*H04N 13/337* (2018.01)

(52) U.S. Cl.
CPC .......... *H04N 9/3167* (2013.01); *H04N 9/312* (2013.01); *H04N 9/3161* (2013.01); *H04N 13/337* (2018.05)

(58) Field of Classification Search
CPC ...... H04N 13/337; H04N 9/31; H04N 9/3167; H04N 9/312; H04N 9/3161; H04N 9/3155; H04N 9/3129; H04N 9/3164
USPC ........ 348/739, 744, 759, 760; 345/589, 690, 345/697
See application file for complete search history.

(56) References Cited

U.S. PATENT DOCUMENTS

2013/0076800 A1* 3/2013 Hatagi ................. G02B 26/105
 345/690
2018/0184076 A1* 6/2018 Goeke .................. H04N 13/363

FOREIGN PATENT DOCUMENTS

| CN | 103428510 A | 12/2013 |
|---|---|---|
| CN | 203909462 U | 10/2014 |
| CN | 107577113 A | 1/2018 |

OTHER PUBLICATIONS

Chinese Office Action cited in counterpart application No. CN 201910521835.4, dated Jun. 24, 2021, 11 pages.

* cited by examiner

*Primary Examiner* — Sherrie Hsia

(74) *Attorney, Agent, or Firm* — Muncy, Geissler, Olds & Lowe, P.C.

(57) ABSTRACT

A projection display system having a projector, the projector includes a laser light source, a lighting system, and a control circuit. The laser light source has a first laser light source module and a second laser light source module. The first and second laser light source modules provide laser light. The lighting system converts the laser light into image light for displaying an image. The image light includes first polarized light and second polarized light. The control circuit controls the laser light source and the lighting system. The control circuit independently controls the light energy output by the first and second laser light source modules to change the intensity of the first and second polarized light.

17 Claims, 4 Drawing Sheets

PROJECTION DISPLAY SYSTEM AND PROJECTOR ADJUSTMENT METHOD

CROSS REFERENCE TO RELATED APPLICATIONS

This Application claims priority of China Patent Application No. 201910521835.4, filed on Jun. 17, 2019, the entirety of which is incorporated by reference herein.

BACKGROUND

Field of the Invention

The present invention relates to a projection display system and a projector adjustment method, and in particular to a projection display system and a projector adjustment method allowing a projector to output a uniform, smooth image.

Description of the Related Art

In recent years, 3D films have been gradually used in various entertainment and educational applications, and 3D projectors that allow multiple people to watch at the same time are constantly improving and lowering prices. 3D projectors are classified into active type and passive type, depending on the display technology used. Passive 3D projectors provide different polarizations for the images provided to the left eye and the images provided to the right eye. Users who view 3D images wear 3D eyeglasses, and the lens for the left eye and the lens for the right eye respectively filter out two different polarized lights, so that the left eye only receives the left eye image, and the right eye only receives the right eye image, thereby achieving the effect of a 3D display.

However, the output of the laser light source of each 3D projector may not be exactly the same. This results in a difference in intensity between the horizontally polarized light and the vertically polarized light that are emitted from the laser light source and passing through the optical path in the lighting system of the 3D projector. Conventional technology can provide a depolarizer in the lighting system, which can homogenize the intensity of the polarized light. If a depolarizer is not provided, the brightness of the left and right eye images may be inconsistent due to an imbalance in the horizontally polarized light and the vertically polarized light, and the user may feel that there is a drop or discontinuity in the brightness or color of the image.

Since the arrangement of the depolarizer affects the color of the light output by the projector, and the component cost of the depolarizer itself is substantial, there is benefit to providing horizontally polarized light and the vertically polarized light output by a 3D projector which are similar or equal in intensity, in order to output a smooth, uniform 3D image, without need for a depolarizer.

SUMMARY

According to an aspect of the present disclosure, there is provided a projection display system including a projector. The projector includes a laser light source, a lighting system, and a control circuit. The laser light source has a first laser light source module and a second laser light source module, for providing a laser light. The lighting system converts the laser light into image light and projects the image light for displaying an image. The image light includes a first polarized light and a second polarized light. The control circuit controls the laser light source and the lighting system, and independently controls the light energy output by the first and second laser light source modules, in order to adjust the intensity of the first and second polarized light.

According to another aspect of the present disclosure, there is provided a projector configuration method for adjusting an image light output by a projector. The projector configuration method includes: providing an independently controllable first laser light source module and a n independently controllable second laser light source module; and controlling, according to a measurement result of the image light output, a light energy output by the first laser light source module and a light energy output by the second laser light source module. The image light includes a first polarized light and a second polarized light. The measurement result includes an intensity of the first polarized light and an intensity of the second polarized light.

DETAILED DESCRIPTION

Figure 1:
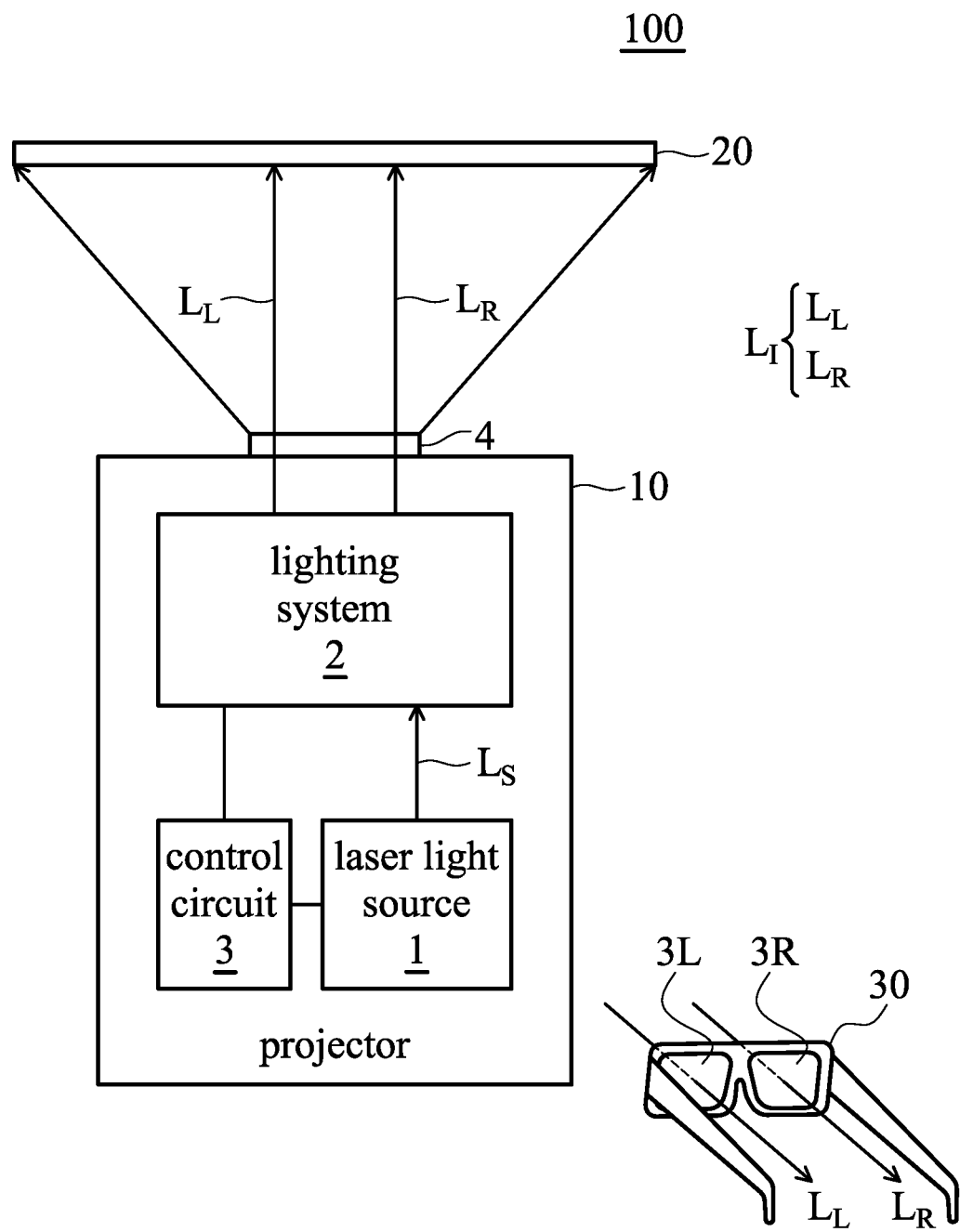
FIG. 1 is a schematic view showing a projection display system according to an embodiment of the present disclosure.

The following description provides different examples for implementing features of the disclosure. Elements and arrangements in the examples are used for describing the present disclosure, and are not intended to limit the present disclosure. For example, the description of a structure in which a first feature is on or above a second feature includes that the first feature and the second feature are in direct contact with each other or there may be other feature/s disposed in between such that the first and second feature are not in direct contact. Shapes, dimensions, and thicknesses in the drawings may not be drawn to scale or may be simplified, and are provided for illustrative purposes only. The terms "first" and "second" used in this specification are for the purpose of explanation and are not intended to limit the scope of the patent. In addition, terms such as "the first feature" and "the second feature" are not limited to the same or different features.

Figure 2:
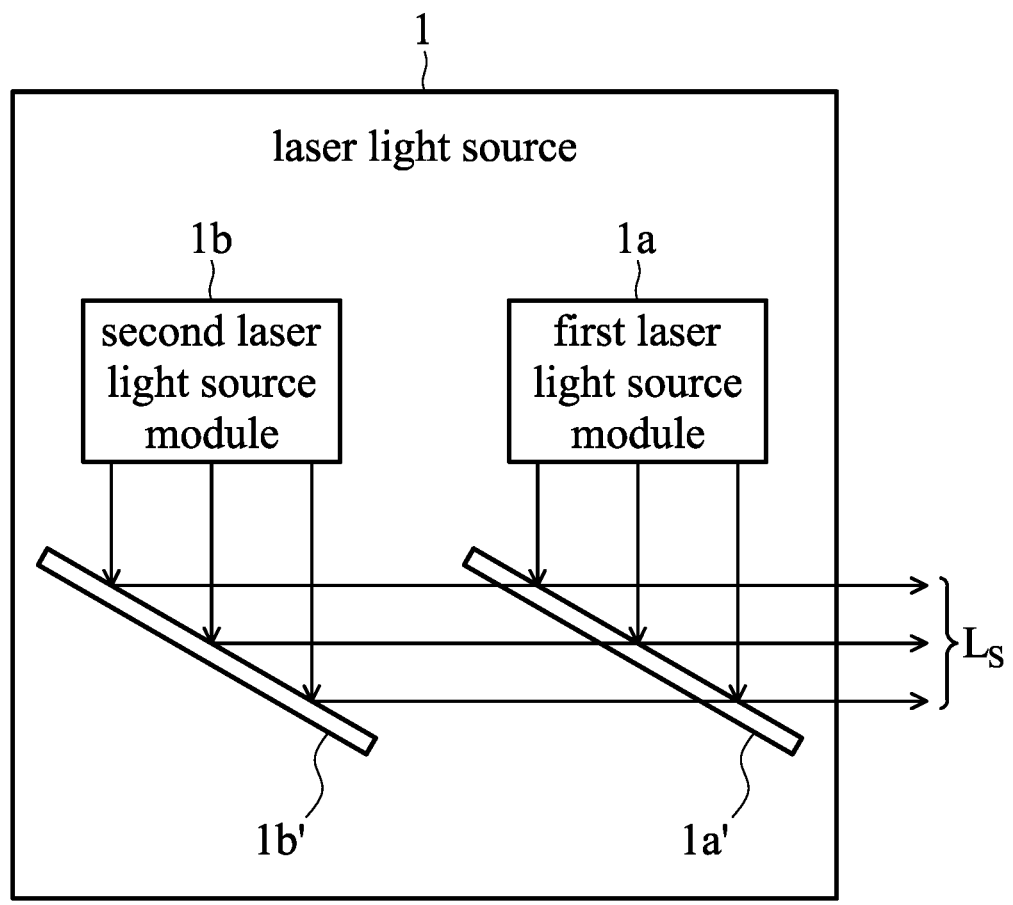
FIG. 2 is a schematic view showing a laser light source according to an embodiment of the present disclosure.

Referring to FIG. 1, the projection display system 100 of the present disclosure includes a projector 10, a display screen 20 for receiving image light LI emitted from the projector 10, and passive eyeglasses 30 for viewing images. The projector 10 includes a laser light source 1, an lighting system 2, a control circuit 3, and a projection lens 4. The laser light source 1 has a plurality of laser light source modules, two sets of laser light source modules are exemplified, but the disclosure is not limited thereto. Referring to FIG. 2, the laser light source 1 has a first laser light source module 1a and a second laser light source module 1b for emitting laser light. Each of the first laser light source module 1a and the second laser light source module 1b includes a LED light emitting array in which a plurality of LEDs are serially arranged. The intensity of light emitted by a series of LEDs may be determined mainly by the supplied current. In one embodiment, the currents supplied to the first laser light source module 1a and the second laser light source module 1b are independent of each other, so that the first laser light source module 1a and the second laser light source module 1b can output light of different intensities according to independent supplied currents. In one embodiment, the first laser light source module 1a and the second laser light source module 1b are configured to emit light in the same direction. The light emitted by the first laser light source module 1a is reflected in a specific direction via the first prism 1a', and the light emitted by the second laser light source module 1b is reflected in the same direction via the second prism 1b'. As shown, the first laser light source module 1a and the second laser light source module 1b are bundled to emit light source light $L_S$ toward the same specific direction. The light source light $L_S$ is output to the lighting system 2 shown in FIG. 1.

The lighting system 2 may include various optical components such as optical lenses, filters, mirrors, fluorescent color wheels, digital micro mirrors, etc. In the projection display system of the prior art, a depolarizer is disposed on the optical path to uniformize the intensity of the polarized light. In the present disclosure, no such depolarizer is provided. The lighting system 2 converts the light source light $L_S$ from the laser light source 1 into the image light $L_I$, and projects it through the projection lens 4 to the display screen 20 outside the projector 10. The display screen 20 may be a projector screen or a surface of any object. The image light $L_I$ projected by the projector 10 includes left eye image light $L_L$ and right eye image light $L_R$ which may be polarized lights of different polarization directions. For example, one is vertically polarized light and the other is horizontally polarized light. The left eye image light $L_L$ and the right eye image light $L_R$ may also be, for example, a combination of right circular polarized light and left circular polarized light, p-polarized and s-polarized, etc.

The user wears the passive eyeglasses 30 to view the image projected on the display screen 20. The passive eyeglasses 30 have a left eyeglass lens 3L that allows only the left eye image light $L_L$ to pass, and a right eyeglass lens 3R that allows only the right eye image light $L_R$ to pass. Thereby, the left and right eyes of the user respectively receive the left eye image light $L_L$ and the right eye image light $L_R$, and the 3D effect of the image is perceived.

The control circuit 3 is configured to independently control the light energy output by the first laser light source module 1a and the second laser light source module 1b after the projector 10 is activated. In an embodiment, the control circuit 3 can individually control the amount of current supplied to the first laser light source module 1a and the second laser light source module 1b in the laser light source 1 to change the light energy output by the first laser light source module 1a and the second laser light source module 1b, but the disclosure is not limited thereto. Other ways that can change the light energy output by the laser light source modules are also included in the present disclosure, such as voltage, power, duty cycle, etc. Further, the control circuit 3 regulates the gray scale of each pixel of the digital micromirror in the lighting system 2 in accordance with the image signal.

The intensity of the left eye image light $L_L$ and the right eye image light $L_R$ may be different due to the manufacturing difference of the projector 10 itself, resulting in a drop or discontinuity in brightness or color of the image. Therefore, the projection display system 100 of the present disclosure may perform a configuration and adjustment for the projector 10 as described below.

Figure 3:
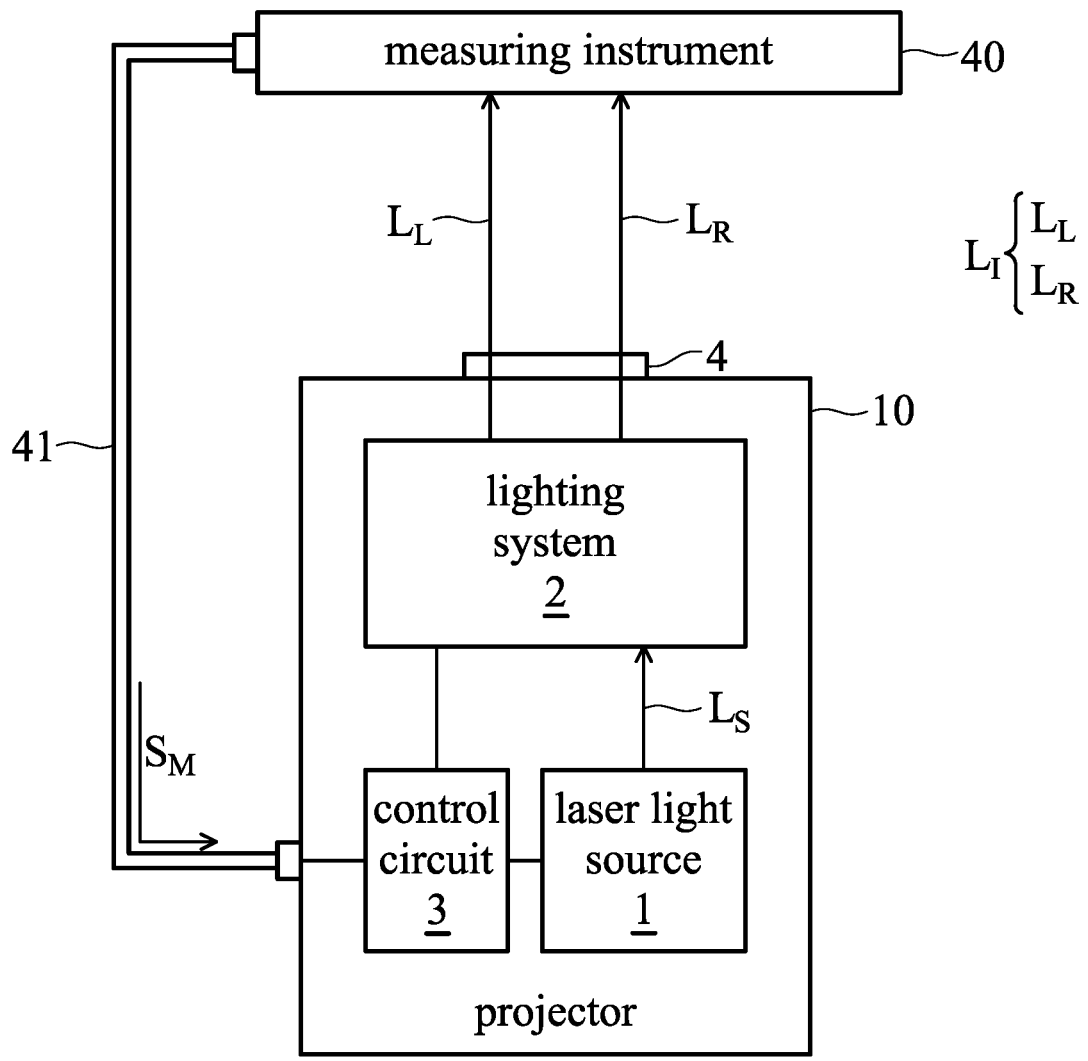
FIG. 3 is a schematic view showing the projection display system of FIG. 1 and further including a measuring instrument.

Referring to FIG. 3, a measuring instrument 40 is disposed near the projection lens 4 of the projector 10, and the measuring instrument 40 and the projector 10 are connected by a data connection line 41 to be used for data transmission. The measuring instrument 40 has a polarizer, and the intensity of the two polarized lights representing the left eye image light $L_L$ and the right eye image light $L_R$ can be measured. The measuring instrument 40 transmits a signal $S_M$ corresponding to the measurement result to the projector 10 through the data connection line 41. According to the measurement result, the projector 10 can change the light intensity output by each of the first laser light source module 1a and the second laser light source module 1b to achieve a desired projection effect. For example, since the intensity difference of the polarized light is mainly affected by the output of the laser light source 1 in the projector 10, when the control circuit 3 of the projector 10 receives the signal $S_M$, the current output to the first laser light source module 1a and the second laser light source module 1b can be operated and adjusted to change the light intensity of each of the first laser light source module 1a and the second laser light source module 1b. After adjusting the input current of the laser light source 1, the measuring instrument 40 can continue to measure the intensity of the two polarized lights of the left eye image light $L_L$ and the right eye image light $L_R$, and transmit the signal $S_M$ through the data connection line 41 to the projector 10 according to the measurement result. In an embodiment, it is preferable to balance the two polarized lights of the left eye image light $L_L$ and the right eye image light $L_R$. Therefore, if the intensity of the two polarized lights is still different, the projector 10 can continue to adjust the current output to the first laser light source module 1a and the second laser light source module 1b according to the signal $S_M$ (which corresponds to the measurement result and is fed back to the projector 10 by the measuring instrument 40). When the measuring instrument 40 senses that the two polarized lights of the left eye image light $L_L$ and the right eye image light $L_R$ have substantially the same intensity, or the difference between the two is below a predetermined value, the projector 10 can be notified to stop adjusting the laser light source 1, or relevant information can be provided to the user operating the projector 10, indicating that the projected image has been optimized. For example, the projector 10 can project a message or information indicating that the current projector setting parameter is already at the optimal setting. In one embodiment, the projector 10 can flash the image or display a specific color to inform the adjustment completion. For example, the projected image on screen may be displayed in red to indicate that the difference in the intensity of the polarized light is too large and not optimal, and adjustment still needs to be performed; and the projected image on screen may be displayed in green to indicate that the intensity of the polarized light is similar or equal (deemed optimal), and the adjustment is completed. The measuring instrument 40 and the data connection line 41 can then be removed, and the projector 10 can output a smooth, uniform 3D image in which the two polarized lights of the left eye image light $L_L$ and the right eye image light $L_R$ are close in intensity. The projector 10 can store the value of the current supplied to the first laser light source module 1a and the current of the second laser light source module 1b as a preset value, to be applied whenever the projector 10 is activated.

The data connection line 41 may be, for example, a connection line of an RS232 communication interface, or other connection lines, such as an Ethernet cable or a USB transmission line. In other embodiments, the data connection line 41 can also be replaced by a wireless communication interface such as Bluetooth, high speed data network, near field communication, or Wi-Fi channel.

A program for automatically adjusting the intensity of the two polarized lights of the left eye image light $L_L$ and the right eye image light $L_R$ may be executed by a dedicated circuit in the control circuit 3 or may be pre-stored in the storage medium and executed by the processing chip in the control circuit 3. The storage medium includes RAM, ROM, EPROM, EEPROM, flash memory, etc.

An embodiment above describes the measuring instrument 40 transmitting the signal $S_M$ to the projector 10, causing the projector 10 to execute a pre-stored program to automatically adjust the intensities of the two polarized lights of the left eye image light $L_L$ and the right eye image light $L_R$. However, the present disclosure is also applicable to manually adjusting the projector 10. The projection display system 100 can provide an input interface that allows the user to manually adjust the current supplied to the first laser light source module 1a and the current supplied to the second laser light source module 1b. The input interface may be an operation panel on the projector 10 or a remote controller communicatively coupled to the projector 10. Instead of the measuring instrument 40 being connected to the projector 10, it can display the measurement result for confirmation by the user. The user views the measurement result displayed by the measuring instrument 40 and manually inputs parameters through the input interface to adjust the current supplied to the first laser light source module 1a and the current supplied to the second laser light source module 1b. When the measuring instrument 40 displays that the intensity of the two polarized lights of the left eye image light $L_L$ and the right eye image light $L_R$ is optimal (e.g. the same or the difference between the two is lower than a predetermined value), the user can stop the adjustment and set the adjusted parameters to preset values of the projector 10. In an embodiment, the projector 10 itself may also project to the display screen 20 the light energy data representing the light energy output by the first laser light source module 1a and the second laser light source module 1b. A display panel may also be configured on the projector 10 to display this light energy data. The light energy data is useful for the user to directly know the light energy output by the two laser light source modules of the projector 10, and allows the user to manually adjust the input parameters through the input interface with reference to the light energy data.

Further to the embodiments described above, the setting of the measuring instrument 40 to adjust the intensity of the polarized light output by the projector 10 can be performed before the projector 10 is shipped as a product, and can also be performed by the user who purchases the projector 10 to adjust at any time. For example, it can be performed when the output quality has degraded after the projector 10 has been used for a long time, or when the projector 10 is to be configured for certain operating environments and the settings need to be changed to achieve the desired display effect.

The measuring instrument 40 may be a device independent of the projector 10, and may also be provided as part of the projector 10. For example, the measuring instrument 40 may be placed on the outer casing of the projector 10, and can slidably or rotationally move towards the image-projection opening of the projector 10 (that is, in front of the projection lens 4). When the projector 10 is to be adjusted, the measuring instrument 40 is moved to the front of the projection lens 4. When the projector 10 is to be normally used to project an image, the measuring instrument 40 is moved away to a position where the image light $L_I$ is not blocked.

The above describes the two polarized light of the left eye image light $L_L$ and the right eye image light $L_R$ are output by a projector 10, but is only exemplary and the present disclosure is not limited thereto. For example, the present disclosure is also applicable to a configuration in which two projectors are used, in which a projector projects the left eye image light $L_L$, and the other projector projects the right eye image light $L_R$. In this configuration, the measuring instrument 40 simultaneously measures the image light $L_I$ of the two projectors, and the user or a software can control the laser light source 1 of only one projector, or simultaneously adjust the laser light sources 1 of the two projectors. In this configuration, one projector outputs one type of polarized light, so a plurality of laser light source modules of the laser light source 1 of the projector do need to be independently operated, but for example be operated by a common current. Moreover, it is not necessary that all of the laser light source modules are configured to emit light in the same direction and elements such as prisms may be used to direct the light.

Figure 4:
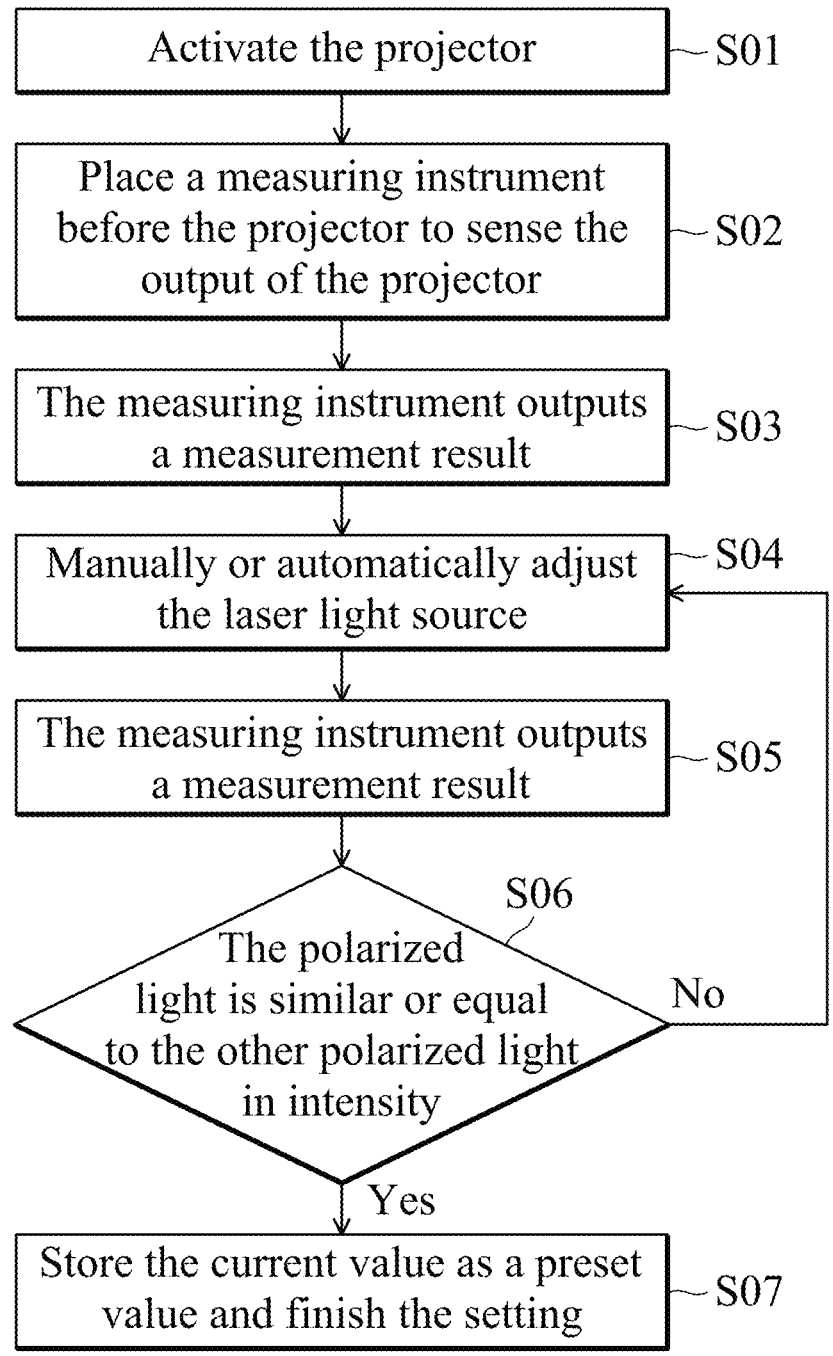
FIG. 4 is a flow chart showing a projector adjustment method according to an embodiment of the present disclosure.

Referring to FIG. 4, a projector adjustment method of the present disclosure will be described. An adjustment method herein described is for adjusting a projector having a first laser light source module and a second laser light source module that are supplied with current independently. That is, the projector adjustment method of the present disclosure is applicable to the embodiment of projector 10 in the projection display system 100 shown in FIGS. 1 to 3. However, the adjustment method is also applicable to various modifications other than the projector 10 previously described.

In step S01 of FIG. 4, the projector is activated to project image light. In step S02, the intensity of two different polarized lights in the image light is sensed by a measuring instrument placed before the image-projection opening of the projector. In step S03, the measuring instrument outputs a measurement result: in the case of manual adjustment, the measuring instrument displays the measurement result on a display; in the case of automatic adjustment, the measuring instrument transmits a signal corresponding to the measurement result to the projector. In step S04, the current supplied to the first laser light source module and the second laser light source module is individually adjusted: in the case of manual adjustment, the user adjusts the parameters via an input interface to the projector; in the case of automatic adjustment, the projector reads the signal received from the measuring instrument, and using a built-in software, adjusts the current supplied to the first laser light source module and the second laser light source module according to the signal. The adjustment made then effects a change to the intensity of one or both of the polarized lights. In step S05, the measuring instrument senses the intensity of the two different polarized lights in the image light emitted by the adjusted projector, and outputs another measurement result. In step S06, a determination is made as to whether or not the measurement result outputted by the measuring instrument indicates that one polarized light is similar or equal to the other polarized light in intensity. "Similar intensities" may be determined by the difference between the intensities of the two polarized lights below a predetermined value. When the polarized light is not similar or equal to the other polarized light in intensity, the process returns to step S04 and the currents of the first laser light source module and the second laser light source module are adjusted again according to the measurement result. The steps may be repeated iteratively until when step S06 determines that the measuring instrument outputs a measurement result indicating that the polarized light is similar or equal to the other polarized light in intensity, and the process proceeds to step S07. In step S07, the current value of the first laser light source module and the current value of the second laser light source module are stored as preset values, and the adjustment setting is completed. Later, when the projector is used, the projector will drive the first laser light source module and the second laser light source module according to the preset values.

By the display system and the adjustment method described above, the intensity of different polarized lights projected by the projector can be adjusted manually or automatically without using a depolarizer, to output a smooth, uniform 3D image.

What is claimed is:

1. A projection display system, comprising
a projector, the projector comprising:
a laser light source for providing a laser light, the laser light source comprising a first laser light source module and a second laser light source module;
a lighting system for converting the laser light to an image light and projecting the image light to display an image, the image light comprising a first polarized light and a second polarized light; and
a control circuit for controlling the laser light source and the lighting system,
wherein the control circuit is configured to independently control a light energy output by the first laser light source module and a light energy output by the second laser light source module, so as to adjust an intensity of the first polarized light and an intensity of the second polarized light;
wherein the projection display system further comprising:
a measuring instrument configured to receive the image light projected by the projector, and measure the intensity of the first polarized light of the image light and the intensity of the second polarized light of the image light;
wherein the measuring instrument is configured to transmit a signal corresponding to a measurement result to the projector, and wherein the control circuit is configured to adjust the light energy output by the first laser light source module and the light energy output by the second laser light source module according to the signal.

2. The projection display system as claimed in claim 1, wherein the first laser light source module and the second laser light source module are configured to emit the laser light in a same direction.

3. The projection display system as claimed in claim 1, wherein according to a signal received by an input interface communicatively coupled to the projector, the projector is configured to:
independently control the light energy output by the first laser light source module and the light energy output by the second laser light source module; and
display a light energy data indicating the light energy output by the first laser light source module and the light energy output by the second laser light source module.

4. The projection display system as claimed in claim 1, wherein the control circuit is further configured to iteratively adjust the light energy output by the first laser light source module and the light energy output by the second laser light source module until the signal corresponding to the measurement result indicates that the first polarized light and the second polarized light are similar or equal in intensity.

5. The projection display system as claimed in claim 1, further comprising:
a data transmission line connecting the measuring instrument and the projector, for use by the measuring instrument to transmit the signal corresponding to the measurement result to the projector via the data transmission line.

6. The projection display system as claimed in claim 1, wherein the lighting system comprises an image-projection opening, and
the measuring instrument is disposed proximal to the image-projection opening and movable relative to the image-projection opening.

7. The projection display system as claimed in claim 1, further comprising:
a pair of 3D eyeglasses comprising a left eyeglass lens and a right eyeglass lens,
wherein the left eyeglass lens is configured to filter one of the first and second polarized light of the image light, and the right eyeglass lens is configured to filter the other one of the first and second polarized light of the image light.

8. The projection display system as claimed in claim 1, wherein the first polarized light of the image light is one of a P-polarized light and a S-polarized light, and the second polarized light of the image light is the other of the P-polarized light and the S-polarized light different to the first polarized light.

9. A projector configuration method for adjusting an image light output by a projector, the projector configuration method comprising:
providing an independently controllable first laser light source module and an independently controllable second laser light source module;
controlling, according to a measurement result of the image light output, a light energy output by the first laser light source module and a light energy output by the second laser light source module, wherein the image light comprises a first polarized light and a second polarized light, and the measurement result comprises an intensity of the first polarized light and an intensity of the second polarized light;
providing a measuring instrument connected to the projector by a data transmission line;
measuring, by the measuring instrument, the intensity of the first polarized light and the intensity of the second polarized light of the image light;
transmitting from the measuring instrument to the projector, a signal corresponding to the measurement result; and
the projector automatically adjusting the light energy output of the first laser light source module and the light energy output of the second laser light source module according to the measurement result.

10. The projector configuration method as claimed in claim 9, wherein the step of controlling the light energy output by the first laser light source module and the second laser light source module comprises iteratively adjusting the first laser light source module and the second laser light source module until the measurement result indicates that the intensity of the first polarized light and the intensity of the second polarized light are similar or equal.

11. The projector configuration method as claimed in claim 10, further comprising: after the measurement result indicates that the intensity of the first polarized light and the intensity of the second polarized light are similar or equal, storing a projector setting parameter corresponding to the light energy output by the first laser light source module and the light energy output by the second laser light source module as a preset value, wherein the preset value is used for configuring the first laser light source module and the second laser light source module of the projector.

12. The projector configuration method as claimed in claim 9, wherein the first laser light source module and the second laser light source module are arranged to emit light in a same direction.

13. The projector configuration method as claimed in claim 9, further comprising:
displaying a light energy information representing the light energy output by the first laser light source module and the light energy output by the second laser light source module; and
using an input interface communicatively coupled to the projector, adjusting a projector setting parameter corresponding to the light energy information to adjust the light energy output by the first laser light source module and the light energy output by the second laser light source module.

14. The projector configuration method as claimed in claim 13, further comprising:
using a measuring instrument to measure the intensity of the first polarized light and the intensity of the second polarized light in the image light;
transmitting, by a data transmission line connecting the measuring instrument and the projector, a signal corresponding to the measurement result from the measuring instrument to the projector; and
displaying to a user a message indicating that the projector setting parameter is optimally set when the intensity of the first polarized light and the intensity of the second polarized light are similar or equal.

15. The projector configuration method as claimed in claim 14, wherein the measuring instrument is movably disposed proximal to an image-projection opening of the projector, wherein the step of using the measuring instrument further comprises:
moving the measuring instrument towards the image-projection opening to receive the image light; and
sensing the intensity of the first polarized light and the intensity of the second polarized light of the image light,
and wherein the projector configuration method further comprises moving the measuring instrument away from the image-projection opening after displaying the message indicating that the projector setting parameter is optimally set.

16. The projector configuration method as claimed in claim 9, wherein the step of automatically adjusting the light energy output comprises iteratively adjusting the light energy output by the first laser light source module and second laser light source module until the signal corresponding to the measurement result indicates that the intensity of the first polarized light and the intensity of the second polarized light are similar or equal.

17. The projector configuration method as claimed in claim 9, wherein the first polarized light of the image light is either a P-polarized light or a S-polarized light, and the second polarized light of the image light is either a S-polarized light or a P-polarized light different to the first polarized light.

* * * * *